United States Patent
Story et al.

(10) Patent No.: US 9,422,177 B2
(45) Date of Patent: Aug. 23, 2016

(54) REMOVAL OF ORGANIC IMPURITIES FROM WATER

(71) Applicant: Tronox LLC, Oklahoma City, OK (US)

(72) Inventors: Phillip M Story, Yukon, OK (US); Laurie I. Jegaden, Edmond, OK (US)

(73) Assignee: Tronox LLC, Oklahoma City, OK (US)

( * ) Notice: Subject to any disclaimer, the term of this patent is extended or adjusted under 35 U.S.C. 154(b) by 225 days.

(21) Appl. No.: 14/506,375

(22) Filed: Oct. 3, 2014

(65) Prior Publication Data

US 2015/0101398 A1    Apr. 16, 2015

Related U.S. Application Data

(60) Provisional application No. 61/889,294, filed on Oct. 10, 2013.

(51) Int. Cl.

| | |
|---|---|
| *C02F 1/52* | (2006.01) |
| *G01M 3/28* | (2006.01) |
| *C02F 9/00* | (2006.01) |
| *C02F 1/66* | (2006.01) |
| *C02F 103/34* | (2006.01) |
| *C02F 1/40* | (2006.01) |
| *F16L 101/30* | (2006.01) |

(52) U.S. Cl.
CPC . *C02F 1/52* (2013.01); *C02F 9/00* (2013.01); *G01M 3/2815* (2013.01); *G01M 3/2823* (2013.01); *C02F 1/40* (2013.01); *C02F 1/66* (2013.01); *C02F 2103/34* (2013.01); *F16L 2101/30* (2013.01)

(58) Field of Classification Search
CPC .................................................. C02F 1/52
See application file for complete search history.

(56) References Cited

U.S. PATENT DOCUMENTS

| | | | |
|---|---|---|---|
| 3,337,452 | A | 8/1967 | Teske et al. |
| 4,006,217 | A | 2/1977 | Faber et al. |
| 4,277,360 | A | 7/1981 | Mellors et al. |
| 6,387,278 | B1 | 5/2002 | Leif et al. |
| 2008/0307960 | A1 | 12/2008 | Hendrickson et al. |
| 2008/0317650 | A1 | 12/2008 | Boren et al. |

FOREIGN PATENT DOCUMENTS

| | | |
|---|---|---|
| GB | 674313 | 6/1952 |
| GB | 1198676 | 7/1970 |
| HU | 34369 A | 3/1982 |
| JP | 03278883 | 12/1991 |

(Continued)

OTHER PUBLICATIONS

Ma et al., Effect of pH on MnOx/GAC catalyzed ozonation for degradation of nitrobenzene, Water Research, vol. 39, Issue 5, Mar. 2005, pp. 779-786.

(Continued)

*Primary Examiner* — Peter Keyworth
(74) *Attorney, Agent, or Firm* — McAfee & Taft

(57) ABSTRACT

The present disclosure relates to the hydrostatic testing of pipelines and to purification of waste water from such testing. More specifically, there is provided a method of hydrostatically pressure testing a natural gas pipeline using water. The waste water, which is contaminated with hydrocarbons, is subsequently treated by contacting it with manganese dioxide so that the hydrocarbons are broken down into carbon dioxide and water.

20 Claims, 1 Drawing Sheet

(56) References Cited

FOREIGN PATENT DOCUMENTS

| | | |
|---|---|---|
| JP | 04071685 | 3/1992 |
| JP | 04131187 | 5/1992 |
| JP | 08089981 | 4/1996 |
| JP | 08257574 | 10/1996 |
| WO | 9929631 A1 | 6/1999 |
| WO | 0220127 A1 | 3/2002 |

OTHER PUBLICATIONS

Veglio F. et al., Fractional factorial experiments in the development of manganese dioxide leaching by sucrose in sulphuric acid solutions, Hydrometallurgy 36, (1994) pp. 215-230.

Su, Haifeng et al., Kinetics of Reductive Leaching of Low-grade Pyrolusite with Molasses Alcohol Wastewater in H2SO4, Catalysis, Kinetics and Reactors, Chinese Journal of Chemical Engineering, 18(5) pp. 730-735 (2010).

Lasheen, T.A., et al., Kinetics of reductive leaching of manganese oxide ore with molasses in nitric acid solution, Hydrometallurgy 98 (2009) pp. 314-317.

Su, Haifeng et al., Leaching of pyrolusite using molasses alcohol wastewater as a reductant, Minerals Engineering 22 (2009) pp. 207-209.

Momade, F.W.Y., et al., Reductive leaching of manganese oxide ore in aqueous methanol-sulphuric acid medium, Hydrometallurgy 51 (1999) pp. 103-113.

Trifoni M., et al., Reductive leaching of manganiferous ores by glucose and H2SO4: effect of alcohols, Hydrometallurgy 59 (2001) pp. 1-14.

Veglio, F., et al., Reductive leaching of a concentrate manganese dioxide ore in acid solution: stoichiometry and preliminary kinetic analysis, International Journal of Mineral Processing 40 (1994) pp. 257-272.

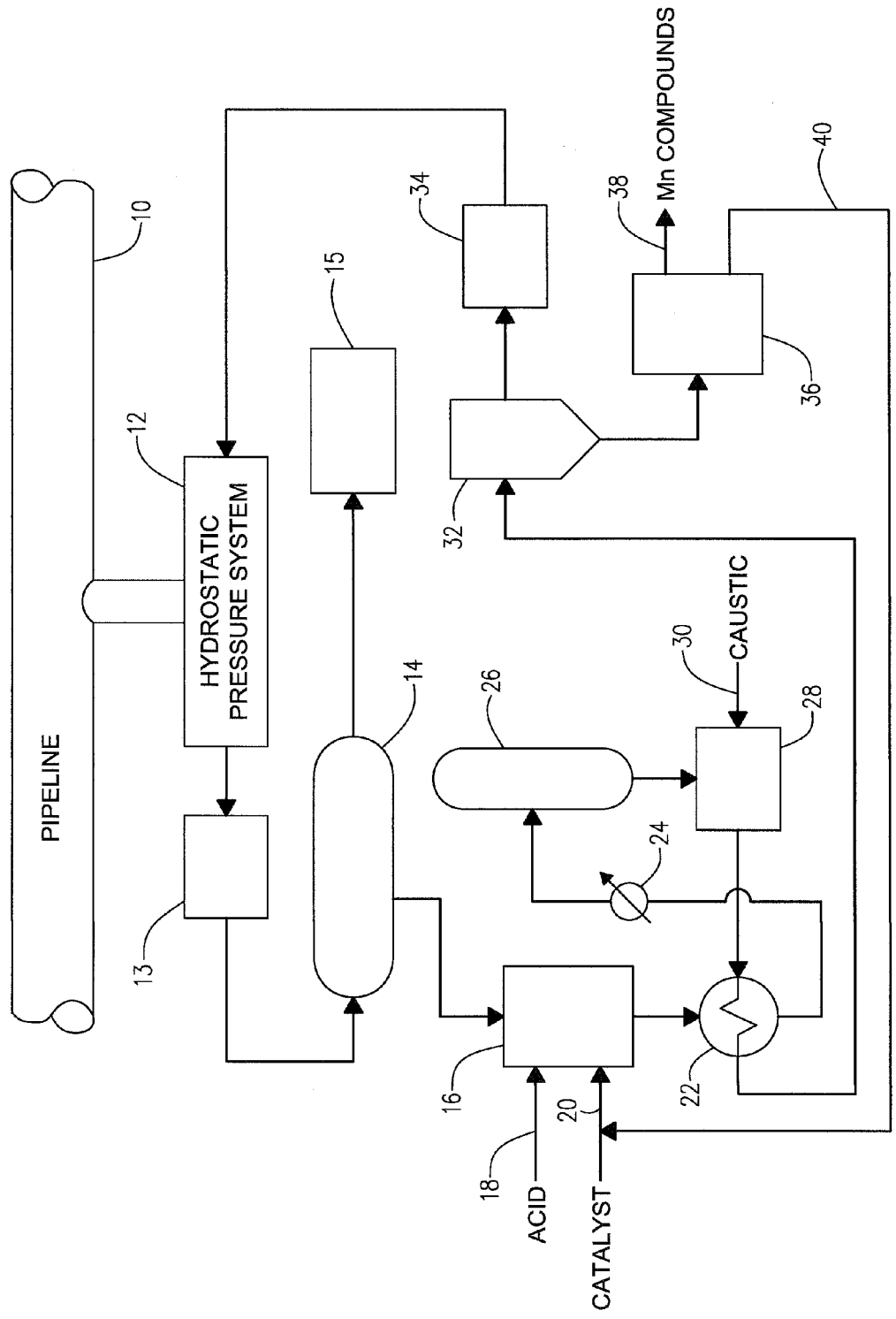

REMOVAL OF ORGANIC IMPURITIES FROM WATER

CROSS-REFERENCE TO RELATED APPLICATIONS

This application claims the benefit of U.S. Provisional Application No. 61/889,294 filed Oct. 10, 2013, which is hereby incorporated by reference.

FIELD

The present disclosure relates to the hydrostatic testing of pipelines and to purification of waste water from such testing.

BACKGROUND

In North America, Europe and other industrialized areas of the world, vast quantities of fluids, including liquids and gases, are transported through pipelines. These fluids include crude oil, lubricating oil, natural gas, gasoline and so forth. These pipelines are often of considerable length and extend over all types of geographic terrains. Many pipelines today are located underneath rivers and lakes and growing mileages of pipelines are located on the surface of the earth covered by seawater, that is, submerged or subsea pipelines.

Hydrostatic testing of a pipeline may be conducted to verify the structural integrity of the pipeline and to comply with applicable federal and/or state regulations. Conventional hydrostatic testing involves filling and pressurizing the pipeline with water. Pressure tightness can be tested by shutting off the supply valve and observing whether there is a pressure loss. Strength is usually tested by measuring permanent deformation of the pipeline. Hydrostatic testing is the most common method employed for testing pipes and pressure vessels. Using this test helps maintain safety standards and durability of a vessel over time. Newly manufactured pieces are initially qualified using the hydrostatic test.

In natural gas pipelines, hydrostatic testing is extremely important as a catastrophic failure of a natural gas pipeline can result in fires and/or explosions causing significant damage. Unfortunately, natural gas pipelines will contain hydrocarbons in addition to the natural gas such as organic liquids that condense from the natural gas, odorizers for the gas, corrosion inhibitors, and lubricants used in compressors and upstream equipment. When water is used to hydrostatically pressure test a natural gas pipeline, it will be contaminated with such hydrocarbons. These hydrocarbons must be removed from the water before the water can be safely discharged back into streams and rivers.

Many methods for removal of hydrocarbons from waste waters are known and practiced. Among these, the most common techniques are biological remediation, by activated sludge, or aerated lagoons, which are widely practiced by cities and chemical companies to treat waste waters. Other possibilities include adsorption by activated carbon. Unfortunately, biological methods require the liquids be aerated. Aeration would naturally result in volatilization of the lower molecular weight species contained in natural gas. Carbon filtration would require that carbon be regenerated from time to time. This is typically done by heating. Again, the low molecular weight species would be volatilized and potentially escape into the air, unless intentionally captured and scrubbed.

SUMMARY

It has been discovered that manganese dioxide can be useful in removing hydrocarbons from pressure-testing water used in the hydrostatic pressure testing of natural gas pipelines. Thus, in accordance with one embodiment, there is provided a method comprising the steps of:

(a) hydrostatically pressure testing a natural gas pipeline using water wherein said water becomes contaminated with hydrocarbons;

(b) recovering the hydrocarbon contaminated water used in the test;

(c) introducing the hydrocarbon contaminated water into a separator to remove hydrocarbons that are above solubility limits to thus produce a hydrocarbon stream and a first recovered water stream generally having a neutral pH from 6 to 8, wherein the first recovered water stream contains dispersed hydrocarbons below the solubility limits;

(d) lowering the pH of the first recovered water stream to be in the range of from 0 to 5 to produce an acidic water stream by adding an acid, generally sulfuric acid;

(e) converting at least part of the dispersed hydrocarbons in the acidic water stream to carbon dioxide and water by contacting the acidic water stream with manganese dioxide and, optionally, a catalyst (solid), generally Zn or Cu sulfates in solution to produce a second recovered water, wherein the converting includes contacting dispersed hydrocarbons with a conversion compound such that at least a portion of the dispersed hydrocarbons are converted, and wherein the first conversion compound comprises manganese dioxide;

(f) increasing the pH of the second recovered water stream to from 8 to 12 to precipitate out resulting solids to thus produce a third recover water stream and the solids; and (g) recycling said second recovered water to be used in additional hydrostatic pressure testing, wherein steps (a) through (e) are carried out in a contained system such that hydrocarbons are not vented to the atmosphere.

According to another embodiment, there is provided a method comprising the steps of:

(a) introducing one or more sealing pigs into a natural gas pipeline to isolate a first section of the pipeline, wherein the pipeline contains hydrocarbon residue and has an internal pressure, which, is at or lower than an operating pressure of the pipeline during introduction of the pigs;

(b) introducing water into the first section to raise the internal pressure in the first section to at least a testing pressure, which is higher than the operation pressure;

(c) determining the durability of the first section at the testing pressure;

(d) removing a hydrocarbon contaminated water from the pipeline;

(e) introducing the hydrocarbon contaminated water into a density based separation system to remove hydrocarbons that are above solubility limits to thus produce a hydrocarbon stream and first recovered water stream generally having a neutral pH from 6 to 8, wherein the first recovered water stream contains dispersed hydrocarbons below the solubility limits and in an amount in the range of 1 to 2000 ppm;

(f) lowering the pH of the first recovered water stream to be in the range of from 1 to 3 by adding sulfuric acid to thus produce an acidic water stream;

(g) converting at least part of the dispersed hydrocarbons in the acidic water stream to carbon dioxide and water to produce a second recovered water, wherein the converting includes contacting dispersed hydrocarbons with a conversion compound such that at least a portion of the dispersed hydrocarbons are converted, wherein the first conversion compound consists essentially of manganese dioxide, and wherein the contacting is at a temperature from 0° C. to 120° C. and occurs in the presence of a catalyst selected from the group consisting of $CuSO_4$, $ZnSO_4$, $CuSO_4$ forming compounds, $ZnSO_4$ forming compounds and mixtures thereof;

(h) increasing the pH of the second recovered water stream to from 9 to 10 to precipitate out resulting solids to thus produce a third recover water stream and the solids;

(i) separating out the catalyst from the solids;

(j) reusing the catalyst in step (g); and (k) recycling said second recovered water to be used in additional hydrostatic pressure testing, wherein steps (a) through (g) are carried out in a contained system such that hydrocarbons are not vented to the atmosphere.

BRIEF DESCRIPTION OF THE DRAWINGS

FIG. 1 is a schematic representation of a system for carrying out one embodiment of a process in accordance with the invention.

DETAILED DESCRIPTION

Referring now to the drawings, wherein like reference numbers are used herein to designate like elements throughout the various views, various embodiments are illustrated and described. The figures are not necessarily drawn to scale; and in some instances, the drawings have been exaggerated and/or simplified in places for illustrative purposes only. Where components of relatively well-known designs are employed, their structure and operation will not be described in detail. One of ordinary skill in the art will appreciate the many possible applications and variations of the present invention based on the following description.

Turning now to FIG. 1, a system for carrying out one embodiment of the process in accordance with the invention is illustrated. The system includes a pipeline 10 on which a hydrostatic pressure test is to be carried out and a hydrostatic pressure system 12 for carrying out the hydrostatic pressure test.

A pressure test is a way in which a pressure vessel, such as pipelines, boilers and fuel tanks, can be tested for strength and leaks. The test involves filling the vessel or pipeline with a fluid, typically water, and pressurizing the vessel or pipeline to a specified test pressure. The specified test pressure is generally higher than the operating pressure to give a factor of safety during normal operation of the vessel or pipe system.

Pressure tightness can be tested by shutting off the supply valve and observing whether there is a pressure loss. Strength is usually tested by measuring permanent deformation of the pipeline or vessel. This type of test helps maintain safety standards and durability of a pipeline or vessel over time.

When the test medium is water; and the test is referred to as a hydrostatic test. During the pressure test, the pipeline is completely filled with water and then pressurized to some pressure over and above operating pressure. The pressure is then monitored for a period of time (usually anywhere from 1 to 8 hours) to observe any pressure losses associated with leaks or integrity problems.

Water that has been used in the hydrostatic pressure system is taken from hydrostatic pressure system 12 and introduced into a separator 14. Prior to introduction into separator 14, the water can be collected and stored in spent water storage tank 13, if desired. Separator 14 is a density based separation system; that is, separator 14 separates hydrocarbons from water based on density. Separator 14 can be a gravity based separation system, a centrifuge, or a hydrocyclone separator, or other similar density based separators.

Hydrocarbons separated from water in separator 14 are introduced into a storage tank 15 for later use or disposal. Water from separator 14, or the first recovered water, is still contaminated with hydrocarbons from the pipeline and is introduced into a mixer 16 where acid 18 and a catalyst 20 can be added and mixed with the first recovered water. Next the first recovered water is preheated in heat exchanger 22 and then further heated, if needed in heater 24.

After heating, the first recovered water is introduced into conversion vessel 26, which may comprise one or more conversion vessels, wherein hydrocarbons are converted or broken down into carbon dioxide and water by reaction with a conversion compound. If more than one conversion vessel 26 is used, they can operate simultaneously or alternatively. Typically, conversion vessels 26 will operate alternatively such that water is processed through one of the conversion vessels 26 while the other vessel is offline such that its conversion compound can be regenerated or replaced. Additionally, where more than two conversion vessels are used in the first set of conversion vessels, two or more conversion vessels can be operated simultaneously to convert hydrocarbons while one or more conversion vessels have their conversion compounds regenerated or replaced. When multiple vessels are used, the fluid flow to the conversion vessels 26 can be controlled by a valve or manifold such that one or more of conversion vessels 26 can be selected to receive the first recovered water.

Conversion vessel 26 can be a stirred tank vessel and operate in a batch operation. Alternatively, conversion vessel 26 can be fixed bed column containing the conversion compound supported on perforated plates or fritted glass supports and operating in a continuous manner.

The conversion effluent from conversion vessel 26 is introduced into mixer 28 where the effluent is mixed with caustic 30 to neutralize the acid. This neutralized effluent is then introduced to heat exchanger 22 to undergo indirect heat exchange with the first recovered fluid from mixer 16. Subsequently, the neutralized effluent is introduced into separation vessel 32. In separation vessel 32, solids are separated from water.

Water from separation vessel 32 is reintroduced into the hydrostatic pressure system 12 for further use in hydrostatic pressure test. Prior to reintroduction into hydrostatic pressure system 12, the water can be collected and stored in clean water storage tank 34. Solids from separation vessel 32 can be further separated in catalyst recovery system 36.

In operation of the above described system, natural gas is drained from a section of a natural gas pipeline 10, which is then isolated for hydrostatic pressure testing. For example, the section can be isolated by introducing one or more sealing pigs into the natural gas pipeline 10 to isolate the section of the pipeline. By virtue of having carried natural gas, the pipeline contains hydrocarbon residue. Typically, these hydrocarbon residues are lower molecular weight species, which were contained in the natural gas. Generally, these hydrocarbon residues typically are C1 to C12 hydrocarbons and can include alkanes, alkenes, as well as substituted alkanes and alkenes, such as haloalkanes, for example chloroalkane, fluoroalkane, or the like. The hydrocarbon residues can be aromatic or aliphatic. For example, polychlorinated biphenyls can be particularly problematic if present and have been typically introduced into the natural gas pipeline through valve sealants and turbine oils.

At this point, the section of the pipeline 10 will typically be at an internal pressure at or lower than an operating pressure of the pipeline. Once the section is isolated, water is introduced to raise the internal pressure to at least a testing pressure, which is higher than the operation pressure. Typically, the testing pressure will be about 120% to about 200% of the operating pressure, and more typically, from 130% to 170% of the operating pressure.

Once the testing pressure is reached, the volume of water in the isolated section is held constant while checking to determine pressure changes or for any deformation or change to the isolated section of pipeline 10. Generally, the test will last from 1 to 8 hours. Upon completion of the pressure test, the water is removed and recovered from the isolated section of pipeline 10. The water removed will have hydrocarbon residues dispersed within it, and thus, be contaminated water.

The hydrocarbon contaminated water is then introduced into separator 14 where hydrocarbons that are above their solubility limit are separated from the water to thus produce a hydrocarbon stream and recovered water stream. For example, if separator 14 is a gravity separator, hydrocarbons above their solubility limit would naturally float on the surface of the water and would be collected. The first recovered water stream contains dispersed hydrocarbons below the solubility limits; that is, the hydrocarbons are below the limit of the amount of solute that will dissolve in water at the temperature of the water within separator 14. Typically, separator 14 will remove all or most all of C7 and greater hydrocarbons in the hydrocarbon contaminated water because these compounds are largely insoluble in water. After separator 14, the first recovered water will generally have hydrocarbons present in the range of 1 to 2000 ppm.

The hydrocarbon stream from separator 14 is introduced into storage tank 15 for later use or disposal. For example, the hydrocarbons can be collected in storage tank 15 until a sufficient amount is collected to sell to a refinery, thus recovering the value of the hydrocarbons.

The first recovered water stream will have a generally neutral pH from 6 to 8. The first recovered water stream is passed into mixer 16 where it is mixed with an acid 18. Generally, acid 18 will be sulfuric acid and will be added in an amount necessary to lower the pH of the first recovered water stream to a pH in the range of 0 to 5, and more preferably, 1 to 3. Thus, an acidic water stream is produced. Also, a catalyst 20 can be mixed in help promote conversion of the hydrocarbons in conversion vessel 26. If used, the catalyst will typically be selected from the group consisting of $CuSO_4$, $ZnSO_4$, $CuSO_4$ forming compounds, $ZnSO_4$ forming compounds and mixtures thereof. The term "$CuSO_4$ forming compounds" refers to compounds that form $CuSO_4$ in the sulfuric acid environment of the acidic water stream, such as copper (II) sulfide (CuO). Similarly, the term "$ZnSO_4$ forming compounds" refers to compounds that form $ZnSO_4$ in the sulfuric acid environment of the acidic water stream. The catalyst will generally be added in an amount of about 10 to 100 grams per liter, and more typically, 15 to 50 grams per liter of acidic water. In some preferred embodiments, no catalyst is used; that is, the conversion in vessel 26 is carried out in the absence of catalyst, by which it is meant that the catalyst is not present in an amount that has any significant effect on the conversion.

The acidic water stream from mixer 16 is passed through heat exchanger 22 and heater 24 to raise the temperature of the recovered water; however, in some embodiments the acidic water is not heated. Subsequently, the acidic water is introduced into conversion vessel 26. Within conversion vessel 26, at least part of the dispersed hydrocarbons in the first recovered water is converted to carbon dioxide and water. Within conversion vessel 26, the dispersed hydrocarbons are contacted with the conversion compound. Typically, the contacting will be carried out at a pH from 0 to 5 and more typically from 1 to 3. The temperature within conversion vessels 26 can be ambient temperature. Generally, the conversion can be carried out at a temperature in the range of from 0° C. to 120° C. It will be appreciated that the use of higher temperatures requires conversion to be carried out at a pressure greater than atmospheric. It has been found that the conversion can be adequately carried out at temperatures less than 50° C., typically between 10° C. to 40° C. and more typically 15° C. to 30° C. However, in some embodiments heating can improve reaction rates; therefore, for these embodiments the conversion can be carried out at a temperature in the range of from 80° C. to 120° C., from 90° C. to 110° C. or from 95° C. to about 100° C.

While not wishing to be bound by theory, it is believed that the conversion compound is not interacting catalytically with the hydrocarbons but rather reacts with the hydrocarbons such that they are broken down to compounds such as carbon dioxide and water; however, there may be some absorption of the hydrocarbons by the conversion compound. Typically, the conversion compound comprises manganese dioxide and, more typically, will consist essentially of manganese dioxide. When contacted in conversion vessels 26 with the dispersed hydrocarbons, the resulting reactions can produce carbon dioxide, water and manganese oxide from the hydrocarbons and manganese dioxide. Typically, at least 60%, at least 70%, at least 80%, at least 90% of the dispersed hydrocarbons will be broken down by this contacting for a residence time of from 15 minutes to 4 hour. The residence time depends on the contact method and coarseness of the manganese dioxide particles, with finer particles reducing the residence time needed to achieve conversion of the hydrocarbons; however, finer particles can result in higher pressure drops in applications using column reactors and can increase the difficulty of separating out the manganese dioxide particles.

The effluent from conversion vessel 26 or the second recovered water is introduced into mixer 28 where a caustic is added to increase the pH of the second recovered water to be in the range from 8 to 12. More typically, the pH can be raised to be in the range form 8.5 to 11, or from 9 to 10. Increasing the pH helps to participate out solids from the second recovered water, as described below. Generally, the caustic can be sodium hydroxide or calcium hydroxide.

The effluent from the mixer 28 is then passed through heat exchanger 22 where its temperature is lowered. In some embodiments, the caustic is added after the second recovered water is passed through heat exchanger 22. Also, in some embodiments the effluent from mixer 28 is further cooled to near 0° before being introduced into separation vessel 32 or while in separation vessel 32.

After cooling and pH adjustment, the second recovered water is introduced into a separation vessel 32, which can be a cyclone separator, centrifuge, filter, clarifier or other suitable means for separating solid participates from water. The solid participates will generally comprise $Mn_3O_4$, unused $MnO_2$ and catalyst ($CuSO_4$ and/or $ZnSO_4$). The solid participates can also comprise $CaSO_4$ and/or $NaSO_4$.

Participates from separation vessel 32 can be introduced into catalyst recovery vessel 38 to further separate catalyst from other participates. The catalyst is then introduced from separation vessel 32 to mixer 16 through line 40. The other participates including manganese compounds are taken from separation vessel 32 and any $MnO_2$ can be recycled back to conversion vessel 26 for reuse.

Water from separation vessel 32 or third recovered water can be subsequently collected and stored in clean water storage tank 34 and/or recycled to be used in additional hydrostatic pressure testing. Typically, the additional hydrostatic pressure testing will be in a second section of pipeline 10 but can be on another pipeline. Because the hydrocarbons contained in the contaminated water are relatively light they are volatile and can dissipate from the water into the atmosphere. Accordingly, it is desirable that the pressure testing and subsequent decontamination steps carried out from separator 14 through conversion vessel 26 are carried out in a contained system such that hydrocarbons are not vented to the atmosphere.

The above described invention could be used in ongoing efforts to test natural gas pipelines. The invention may also be beneficially employed to remediate flow back waters generated by hydrofracturing to recover hydrocarbons from shale formations.

EXAMPLE

Batch conversions were carried for 6 samples of gasoline in water. The resulting samples had a chemical oxygen demand in the range of 800 to 1300 mg/L. The samples were introduced into a stirred tank reactor with sulfuric acid to achieve a pH of 1. In the Examples, CuO was used to generate $CuSO_4$ catalyst insitu in the reactor. Two samples underwent batch conversion with 25 gram per liter $MnO_2$ and 25 grams per liter CuO. Two samples underwent batch conversion with 25 gram per liter $MnO_2$ and no CuO. Two samples under went batch conversions with no $MnO_2$ and 25 grams per liter CuO. Half the samples underwent batch conversion for 2 hours and half for 4 hours. The effluent from the batch conversion was tested using Fast Fourier Transform Infrared Spectroscopy to derive relative concentrations of carbon between the samples before and after treatment. The results are shown in Table 1.

TABLE 1

| Sample | $MnO_2$ | CuO | Time | Carbon Reduction |
|---|---|---|---|---|
| Sample 1 | 25 g/L | 25 g/L | 4 hr | 80% |
| Sample 2 | 0 g/L | 25 g/L | 4 hr | 57% |
| Sample 3 | 25 g/L | 0 g/L | 4 hr | 92% |
| Sample 4 | 25 g/L | 25 g/L | 2 hr | 62% |
| Sample 5 | 0 g/L | 25 g/L | 2 hr | 56% |
| Sample 6 | 25 g/L | 0 g/L | 2 hr | 70% |

As can be seen from Table 1, $MnO_2$ results in a greater carbon reduction and hence conversion of more hydrocarbons than the samples using $CuSO_4$ alone. The $CuSO_4$ being produced by the CuO and sulfuric acid mixture. Surprisingly, $MnO_2$ alone had a greater carbon reduction than $MnO_2$ used in conjunction with $CuSO_4$. Accordingly, a process using sequential batch conversions with at least the first batch being limited to only $MnO_2$ as the conversion compound would result in a much lower hydrocarbon content than the first batch being not limited to only $MnO_2$.

While various embodiments of the invention have been shown and described herein, modifications may be made by one skilled in the art without departing from the spirit and the teachings of the invention. The embodiments described here are exemplary only and are not intended to be limiting. Many variations, combinations, and modifications of the invention disclosed herein are possible and are within the scope of the invention. Accordingly, the scope of protection is not limited by the description set out above, but is defined by the claims which follow. The scope includes all equivalents of the subject matter of the claims.

That which is claimed is:

1. A method comprising:
   (a) hydrostatically pressure testing a natural gas pipeline using water wherein said water becomes contaminated with hydrocarbons;
   (b) recovering the hydrocarbon contaminated water used in the test;
   (c) introducing the hydrocarbon contaminated water into a separator to remove hydrocarbons that are above solubility limits to thus produce a hydrocarbon stream and a first recovered water stream having a pH from 6 to 8, wherein the first recovered water stream contains dispersed hydrocarbons below the solubility limits;
   (d) lowering the pH of the first recovered water stream to be in the range of from 0 to 5 to produce an acidic water stream;
   (e) converting at least part of the dispersed hydrocarbons in the acidic water stream to carbon dioxide and water to produce a second recovered water, wherein the converting includes contacting dispersed hydrocarbons with a conversion compound such that at least a portion of the dispersed hydrocarbons are converted, and wherein the first conversion compound comprises manganese dioxide;
   (f) increasing the pH of the second recovered water stream to from 8 to 12 to precipitate out resulting solids to thus produce a third recover water stream and the solids; and
   (g) recycling said second recovered water to be used in additional hydrostatic pressure testing, wherein steps (a) through (e) are carried out in a contained system such that hydrocarbons are not vented to the atmosphere.

2. The method of claim 1, wherein the step of hydrostatically pressure testing further comprises:
   introducing one or more sealing pigs into the pipeline to isolate a first section of the pipeline, wherein the pipeline contains hydrocarbon residue and has an internal pressure, which, is at or lower than an operating pressure of the pipeline during introduction of the pigs;
   introducing water into the first section to raise the internal pressure in the first section to at least a testing pressure, which is higher than the operation pressure;
   determining the durability of the first section at the testing pressure; and
   removing the hydrocarbon contaminated water from the pipeline.

3. The method of claim 1, wherein the separator is a density based separation system.

4. The method of claim 1, wherein the first recovered water has a dispersed hydrocarbon content of from 1 ppm to 2000 ppm.

5. The method of claim 1, wherein step (d) comprises lowering the pH of the first recovered water stream to be in the range of from 1 to 3.

6. The method of claim 5, wherein the contacting with the conversion compound is carried out at from 0° C. to 120° C.

7. The method of claim 6, wherein the contacting with the conversion compound is carried out at from 10° C. to 40° C.

8. The method of claim 6, wherein the first conversion compound consists essentially of manganese dioxide.

9. The method of claim 8, wherein the contacting with the conversion compound is carried out in the absence of a catalyst.

10. The method of claim 9, wherein the contacting with the conversion compound is carried out at from 80° C. to 110° C.

11. The method of claim 10, wherein the first recovered water has a dispersed hydrocarbon content of from 1 ppm to 2000 ppm.

12. The method of claim 1, wherein the acid is sulfuric acid.

13. The method of claim 12, wherein the contacting with the conversion compound is carried out in the presence of a catalyst selected from the group consisting of $CuSO_4$, $ZnSO_4$, $CuSO_4$ forming compounds, $ZnSO_4$ forming compounds and mixtures thereof.

14. The method of claim 13, further comprising separating out the catalyst from the solids and reusing the catalyst in step (e).

15. The method of claim 14, wherein the first conversion compound consists essentially of manganese dioxide.

16. The method of claim 15, wherein the contacting with the conversion compound is carried out at from 0° C. to 120° C.

17. The method of claim 16, wherein step (d) comprises lowering the pH of the first recovered water stream to be in the range of from 1 to 3.

18. The method of claim 17, wherein the first recovered water has a dispersed hydrocarbon content of from 1 ppm to 2000 ppm.

19. The method of claim 18, wherein the contacting with the conversion compound is carried out at from 80° C. to 110° C.

20. A method comprising:
(a) introducing one or more sealing pigs into a natural gas pipeline to isolate a first section of the pipeline, wherein the pipeline contains hydrocarbon residue and has an internal pressure, which, is at or lower than an operating pressure of the pipeline during introduction of the pigs;
(b) introducing water into the first section to raise the internal pressure in the first section to at least a testing pressure, which is higher than the operation pressure;
(c) determining the durability of the first section at the testing pressure;
(d) removing a hydrocarbon contaminated water from the pipeline;
(e) introducing the hydrocarbon contaminated water into a density based separation system to remove hydrocarbons that are above solubility limits to thus produce a hydrocarbon stream and first recovered water stream having a pH from 6 to 8, wherein the first recovered water stream contains dispersed hydrocarbons below the solubility limits and in an amount in the range of 1 to 2000 ppm;
(f) lowering the pH of the first recovered water stream to be in the range of from 1 to 3 by adding sulfuric acid to thus produce an acidic water stream;
(g) converting at least part of the dispersed hydrocarbons in the acidic water stream to carbon dioxide and water to produce a second recovered water, wherein the converting includes contacting dispersed hydrocarbons with a conversion compound such that at least a portion of the dispersed hydrocarbons are converted, wherein the first conversion compound consists essentially of manganese dioxide, and wherein the contacting is at a temperature from 0° C. to 120° C. and occurs in the presence of a catalyst selected from the group consisting of $CuSO_4$, $ZnSO_4$, $CuSO_4$ forming compounds, $ZnSO_4$ forming compounds and mixtures thereof;
(h) increasing the pH of the second recovered water stream to from 9 to 10 to precipitate out resulting solids to thus produce a third recover water stream and the solids;
(i) separating out the catalyst from the solids;
(j) reusing the catalyst in step (g); and
(k) recycling said second recovered water to be used in additional hydrostatic pressure testing, wherein steps (a) through (g) are carried out in a contained system such that hydrocarbons are not vented to the atmosphere.

* * * * *